United States Patent
Glazberg et al.

(10) Patent No.: US 10,248,824 B2
(45) Date of Patent: *Apr. 2, 2019

(54) ENCODING INFORMATION IN PHYSICAL PROPERTIES OF AN OBJECT

(71) Applicant: Glazberg, Applebaum & Co., Ramat Gan (IL)

(72) Inventors: Ziv Glazberg, Ramat Gan (IL); Nadav Applebaum, Ramat Gan (IL); Shmuel Ur, Shorashim (IL)

(73) Assignee: Glazberg Appelbaum & Co., Ramat Gan (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/488,469

(22) Filed: Apr. 15, 2017

(65) Prior Publication Data

US 2017/0220835 A1    Aug. 3, 2017

Related U.S. Application Data

(63) Continuation of application No. 14/599,509, filed on Jan. 18, 2015, now Pat. No. 9,623,604.

(30) Foreign Application Priority Data

Jan. 23, 2014    (IL) .......................................... 230637

(51) Int. Cl.
| | |
|---|---|
| G06K 7/10 | (2006.01) |
| G06K 7/14 | (2006.01) |
| G06Q 30/00 | (2012.01) |
| B33Y 80/00 | (2015.01) |
| G05B 19/4099 | (2006.01) |
| G06K 19/06 | (2006.01) |

(Continued)

(52) U.S. Cl.
CPC ............ *G06K 7/1417* (2013.01); *B29C 64/00* (2017.08); *B29C 64/386* (2017.08); *B33Y 80/00* (2014.12); *G05B 19/4099* (2013.01); *G06K 7/1413* (2013.01); *G06K 19/06028* (2013.01); *G06K 19/06037* (2013.01); *G06Q 30/0185* (2013.01); *B33Y 50/00* (2014.12)

(58) Field of Classification Search
CPC ... G06K 7/10722; G06K 7/14; G06K 7/10851
USPC .................................................. 235/454, 494
See application file for complete search history.

(56) References Cited

U.S. PATENT DOCUMENTS

| | | | |
|---|---|---|---|
| 9,623,604 B2 * | 4/2017 | Glazberg | ............ B29C 67/0051 |
| 2015/0066440 A1 * | 3/2015 | Chen | ................... G06F 17/5009 703/1 |
| 2015/0287247 A1 * | 10/2015 | Willis | ..................... G06T 19/20 345/419 |

* cited by examiner

*Primary Examiner* — Ahshik Kim
(74) *Attorney, Agent, or Firm* — The Law Office of Joseph L. Felber

(57) ABSTRACT

A method, system for encoding or decoding information in physical properties of an object. A tangible product comprises a three dimensional tangible object having modified physical properties; and wherein the modified physical properties are a modification of physical properties, wherein the modification encodes information. A method comprising: obtaining a representation of a three dimensional object having physical properties; obtaining information to encode; determining modified physical properties by modifying the physical properties to encode within the modified physical properties the information; and producing a tangible product, wherein the tangible product is the three dimensional object having the modified physical properties.

25 Claims, 7 Drawing Sheets

(51) Int. Cl.
 *B29C 64/00* (2017.01)
 *B29C 64/386* (2017.01)
 *B33Y 50/00* (2015.01)

ENCODING INFORMATION IN PHYSICAL PROPERTIES OF AN OBJECT

CROSS-REFERENCE TO RELATED APPLICATIONS

This application is a continuation of application Ser. No. 14/599,509, filed Jan. 18, 2015, which is hereby incorporated by reference in its entirety.

TECHNICAL FIELD

The present disclosure relates to encoding of information in general, and to three-dimensional product identification, in particular.

BACKGROUND

An Additive Manufacturing Apparatus (AMA), often referred to as Three-Dimensional (3D) printer, is a machine that produces tangible products from a digital representation, such as retained in a data file. Such an operation is also referred to as AMA production. 3D printers can produce objects that may be used for any purpose, from prototyping trough full-scale production including tooling and post-production customization. A 3D printer may utilize an additive process, where successive layers of material are laid down on top of each other to produce the product. In some cases, the 3D printer may utilize a variety of different materials to produce the product. Each layer is "printed" by adding material in desired locations. The smallest, most basic, element produced by the 3D printer is referred to as a "voxel", and it represents a volumetric pixel in the product. Additive process may be distinguished from other manufacturing processes such as for example traditional subtractive machining such as filing, milling, drilling, welding, grinding, and the like.

Recently 3D printers are becoming more affordable and therefore more available in the consumer marketplace. The practical ability of individuals, hobbyist and organizations to produce, using 3D printers, infringing copies or illegal products for personal use, nonprofit distribution, or for sale raises a major challenge for the legal system and law enforcement agencies.

Early in 2013 a disclosed plan of a working plastic gun was found on the Internet and could be reproduced by anybody with a 3D printer. It was a version of a 3D printable AR-15 type rifle capable of lasting more than 650 rounds. After that incidence, questions were raised regarding the effects that 3D printing may have on gun control effectiveness. The U.S. Department of Homeland Security and the Joint Regional Intelligence Center released a memo stating that "significant advances in 3D printing capabilities, availability of free digital 3D printer files for firearms components, and difficulty regulating file sharing may present public safety risks from unqualified gun seekers who obtain or manufacture 3D printed guns," and that "proposed legislation to ban 3D printing of weapons may deter, but cannot completely prevent their production. Even if the practice is prohibited by new legislation, online distribution of these digital files will be as difficult to control as any other illegally traded music, movie or software files."

BRIEF SUMMARY

One exemplary embodiment of the disclosed subject matter is a method comprising: obtaining a representation of a three dimensional object having physical properties; obtaining information to encode; determining modified physical properties by modifying the physical properties to encode within the modified physical properties the information; and producing a tangible product, wherein the tangible product is the three dimensional object having the modified physical properties.

Another exemplary embodiment of the disclosed subject matter is a tangible product comprising: a three dimensional tangible object having modified physical properties; and wherein the modified physical properties are a modification of physical properties, wherein the modification encodes information.

Yet another exemplary embodiment of the disclosed subject matter is a method comprising: obtaining a digital representation of a three dimensional object having physical properties; determining information to be encoded within the physical properties of the three dimensional object; and generating, by a processor, a modified digital representation of a modified three dimensional object having modified physical properties, wherein the modified three dimensional object is based on the three dimensional object, wherein the modified physical properties is a modification of the physical properties, wherein the modification encodes the information.

Yet another exemplary embodiment of the disclosed subject matter is a method comprising: analyzing physical properties of a three dimensional tangible object, wherein the three dimensional tangible object was produced by an additive manufacturing apparatus, wherein information is encoded within the physical properties; decoding, by a processor, the information from the physical properties; and outputting the information.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
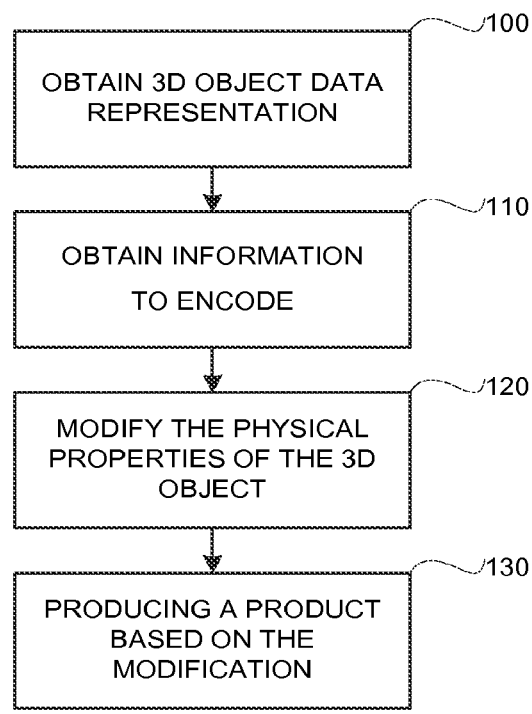
FIG. 1 shows a flowchart diagram of a method, in accordance with some exemplary embodiments of the disclosed subject matter.

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational Steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is to identify a source of a produced product which was produced using a 3D printer. The source, such as a specific machine which was used to produce the product, may allow law enforcement agencies to identify a culprit who has used a printed product during a crime.

Another technical problem dealt with by the disclosed subject matter is to allow proprietors of designs to be able to determine, for a given product that was produced using a 3D printer, whether the produced product was produced under license or with their consent. Proprietors of the designs may be, for example, the designer or other owner of a copyright on the design, a design patent on the design, or other Intellectual Property (IP) rights in the designs. The proprietors may also be exclusive licensors of IP rights, licensors of IP rights, or other parties who have interest in controlled distribution of the design.

It will be understood that in traditional manufacturing process, it may be hard for an infringer to create knock-offs of a design. However, with the introduction of 3D printing technology a counterfeiter may get a hold of a digital file of the design and use it to produce infringing articles. In the digital world, the ease of online data distribution exposes the proprietor of designs to similar challenges as the music, movie and software industries are facing today. The disclosed subject matter deals with this problem of providing effective monitoring and tracing of products that were produced using 3D printing technologies.

Yet another technical problem dealt with by the disclosed subject matter is to encode the identifying information within the product, so as to allow decoding of the information from the product itself. In some embodiments, the encoded identifying information may be difficult or impossible to remove from either the 3D product or the digital representation of the product.

One technical solution is to modify the product physical properties in a way that the delta between the modified product and the original product may represent the encoded identifying information. The modification of the physical properties of the product may be, for example, a change of the aspect ratio, a change in length of the product, a change in the chemical composition, a change of the electromagnetic properties, a change in the infill density used to produce the product, a combination thereof, or the like. In some embodiments, the modification may include embedding within the product one or more replicas of signatures. A signature may be a matrix which encodes the information. The replica of the signature may be an array of cells each of which corresponding to a different value based on its content. In some embodiments, a plurality of replicas is embedded within the product, in a body portion thereof, and therefore is invisible to the naked eye. Replicas that are excluded from the skin portion of the product may also be harder to remove as they are concealed by the skin portion.

Another technical solution is to encode identifying information related to the manufacturing process in the physical properties of the produced product. The manufacturing process identifying information may be, for example, a Media Access Control (MAC) Address of the AMA used to produce the product or other identifiers of the AMA, a product serial number, manufacturing time, a combination thereof, or the like.

Yet another technical solution is to encode proprietor information within the physical properties of the product. The proprietor information may be, for example, a part number, a brand name, any data relevant for the product identification, licensing information, identification of a licensee, a combination thereof, or the like.

Yet another technical solution is to encode the information provided by the proprietor in a digital representation of the product. In some embodiments, a file retaining a representation of the product is modified so as the modification introduces into the modified physical properties of the product the information. The modification of the file may, for example, modify a length of the product, change in aspect ratio, embedding of replicas of a signature within the product, or the like.

One technical effect of utilizing the disclosed subject matter is equipping the 3D additive manufacturing process with tools to conceal relevant identifying information by integrating that information within the physical properties of the produced article. Therefore, an attempt to remove the product identifying information from a product that was manufactured by an AMA utilizing the disclosed subject matter process may be difficult or impossible.

Another technical effect of utilizing the disclosed subject matter is that the AMA may integrate its own identifier within the printed article during the manufacturing process, regardless of the manufacturer intentions. This may serve as an equivalent of fingerprints for tracing the manufacturer post factum. In some exemplary embodiments, the disclosed subject matter may be used to establish a technique for protecting intellectual property and assisting law enforcement with tracing illegal products such as guns and unauthorized copies of commercial products which were produced by 3D printers.

Yet another technical effect of utilizing the disclosed subject matter is to enable proprietors and law enforcement agencies to utilize scientific equipment that may be used for tracing the perpetrators and determining the product authenticity. Such scientific equipment may be a Computerized Tomography (CT) scanner, a Magnetic Resonance Imaging (MRI), a 3D high resolution scanner, a high-resolution scale, a spectrometer, or the like. In some exemplary embodiments, the scientific equipment may be non-specialized equipment which may be publicly available. In some exemplary embodiments, decoding information may be performed using destructive process in which layers of the product may be iteratively removed to analyze the physical properties of the product and identify signatures embedded therein.

Yet another technical effect of the disclosed subject matter is providing the proprietor with a file that is usable for AMA production. The proprietor may transfer the file to recipients to be used in AMA production. As a result of the fact that the physical properties of the product, as defined in the file, encode specific information provided by the proprietor, the proprietor may monitor, post factum, use of the file in AMA production. As an example, the proprietor may encode information identifying the recipient and by decoding such information from produced products, may identify a recipient which has produced unauthorized copies or provided the file to be used in production of such infringing copies.

Referring now to FIG. 1, showing a flowchart diagram of a method in accordance with some exemplary embodiments of the disclosed subject matter.

In Step 100, a data representation of the 3D object may be obtained to be used in producing a product. The data representation may be a digital data file obtained by an I/O module such as 607 of FIG. 6. The digital file may be a Computer Aided Design (CAD) format file, a Standard Template Library (STL) format file, a Polygon File Format (PLY) format file, Virtual Reality Modeling Language (VRML) format file, X3D format file, or the like. Additionally or alternatively, the data representation may be a digital representation that is not necessarily retained within any file.

In Step 110, information may be obtained. The information may be information provided by a proprietor, information related to the manufacturing process, a combination thereof, or the like. In some exemplary embodiments, the proprietor information may be a part number, a product number, a brand name, any data relevant for the product identification, licensing information, identification of a licensee, a combination thereof, or the like. The information may be obtained from a user, from a digital repository, or the like. In some exemplary embodiments, the information may be obtained by an I/O module such as 607 of FIG. 6. In some exemplary embodiments, the manufacturing process information may be a MAC address, a product serial number, manufacturing time, a combination thereof, or the like. The manufacturing process information may be obtained by an I/O module such as 607 of FIG. 6. Additionally or alternatively, the manufacturing process information may be acquired on board an additive manufacturing apparatus that is being used to produce the product.

In Step 120, the information may be encoded. The encoding may be accomplished by modifying the physical properties of the product. The encoding may be performed by a processor such as 602 of FIG. 6. In some exemplary embodiments, the modification of physical properties may be a change of the aspect ratio, a change in length of the product, a change in the chemical composition, a change of the electromagnetic properties, a change in the infill density used to produce the product or portion thereof, a combination thereof, or the like.

In some exemplary embodiments, the encoded information may be represented by a value of a physical property of the modified product (e.g., the length of the product, or a calculation based thereof), a difference between the values of the physical property of the modified product and the original data representation of the 3D object obtained the in Step 100 (e.g., the difference in length between the original object and the modified object), a combination thereof, or the like.

In some exemplary embodiments, the encoded information may be represented by the absolute value of the physical property of the product. As an example, the encoded information may be encoded in a length of the product. The length may be measured in micro millimeters and the encoded information may be encoded in the last one or more digits of the length measurement. As another example, the encoded information may be encoded as in a value obtained from performing a modulo operation on the length measurement, such as modulo twelve. In some exemplary embodiments, the modified product may be modified so as to modify the value of the physical property to be the value which encodes the desired information. In some exemplary embodiments, the value may be increased or decreased in order to achieve the desired value.

In some exemplary embodiments, the modification may include embedding within the product one or more replicas of a signature. In some exemplary embodiments, the signature may encode the information using a matrix of one or more dimensions. In some exemplary embodiments, the matrix may be a two dimensional or three dimensional matrix, and may be represented by replicas such as 400 of FIG. 4 and 500 of FIG. 5. A replica may be an array of cells each of which may correspond to a different value based on its content. In some embodiments, a plurality of replicas of the signature may be embedded within the body portion of the product such as 350 of FIG. 3 and may be excluded from the skin portion of the product. In such embodiments, the replicas may be invisible to the naked eye.

In Step 130, the modified representation of the 3D product may be produced. The production of the 3D product may be executed by an additive manufacturing apparatus such as 640 of FIG. 6. In some exemplary embodiments, the produced product may retain in its physical properties that can be decoded in order to obtain the information from the produced product.

In some exemplary embodiments, the method of FIG. 1 may be executed by an additive manufacturing apparatus, which may introduce into the produced product information which the user may or may not desire to be included in the product. Such information may, for example, be used to trace the producer of the product.

Additionally or alternatively, Steps 100-120 may be executed by a computerized device, such as a personal computer, in preparation for producing the product using an additive manufacturing apparatus.

Figure 2:
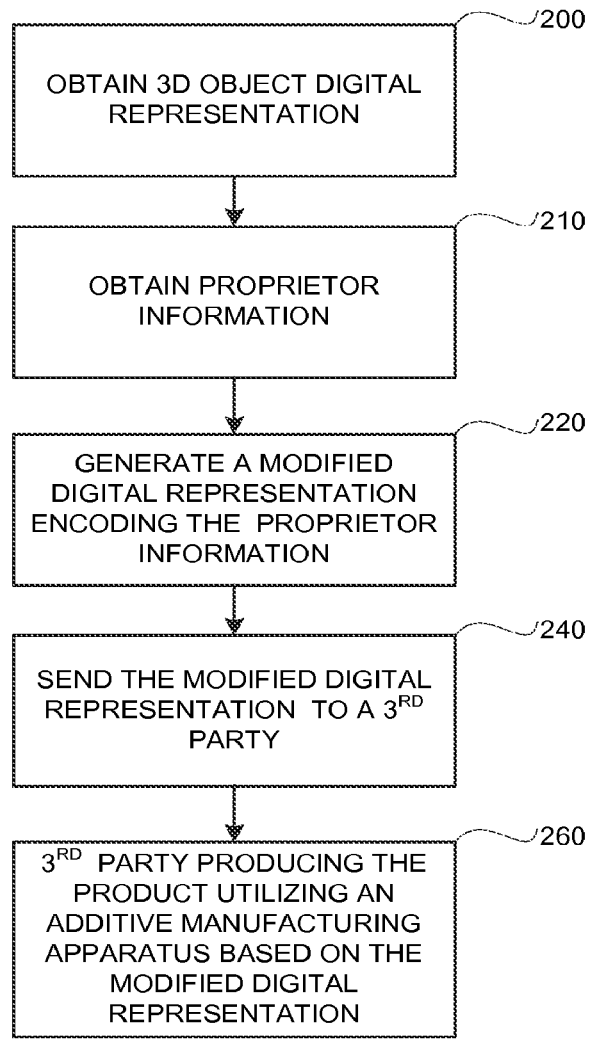
FIG. 2 shows a flowchart diagram of a method, in accordance with some exemplary embodiments of the disclosed subject matter.

Referring now to FIG. 2 showing a flowchart diagram of a method in accordance with some exemplary embodiments of the disclosed subject matter.

In Step 200, a digital representation of the 3D object may be obtained to be used in producing a product. Step 200 may be similar to Step 100 of FIG. 1. The digital representation may be a computer file such as a format file usable for CAD software, a computer file representing the 3D object as layers to be printed by an AMA (e.g., STL format file), a file generated by a scanner (e.g., PLY format file), 3D vector graphics representation (e.g., VRML or X3D format file). In some exemplary embodiments, the digital file may be obtained by an I/O module such as 607 of FIG. 6, from sources such as for example the Internet such as 660 of FIG. 6, a 3D scanner such as 650 of FIG. 6, a workstation such as 607 of FIG. 6, or the like.

In Step 210, the proprietor information may be obtained. The proprietor information may be a part number, a brand name, any data relevant for the product identification, licensing information, identification of a license a combination thereof, or the like. In some exemplary embodiments, the information may be retrieved from a memory unit such as 605 of FIG. 6. Additionally or alternatively, the information may be entered by a user such 695 of FIG. 6 using workstation such as 690 of FIG. 6.

In Step 220, a modified digital representation encoding the proprietor information may be generated. In some exemplary embodiments, the modification of Step 220 may be similar to that of Step 120 of FIG. 1. In some exemplary embodiments, a digital file retaining the modified digital representation may be created.

In Step 240, the generated file, or other digital representation of the modified 3D product, may be sent to a third party entity to be used in producing the product. A third party entity may be a manufacturing facility, a distributor of the given product, an end-user client, any product licensee relevant for producing the product, or the like.

In Step 260, the modified digital representation of the product may be produced by the third party. The production of the modified digital representation may utilize an additive manufacturing apparatus such as 640 of FIG. 6.

In some exemplary embodiments, the generated file may be distributable over a computerized network and may be shared by the third party entity with other entities which may or may not be authorized to produce the product. The disclosed subject matter may be utilized to trace the third party that was provided with the file and as a result identify security leaks, unauthorized distribution, or the like.

In some exemplary embodiments, the proprietor may provide different third parties with different files, each of which retaining different proprietor information. In some exemplary embodiments, based on the encoded information in the product, the proprietor may identify which version was used to produce the product. As a result, the proprietor may identify which of the different third parties was involved, intentionally or unintentionally, in the production of the product.

Figure 3:
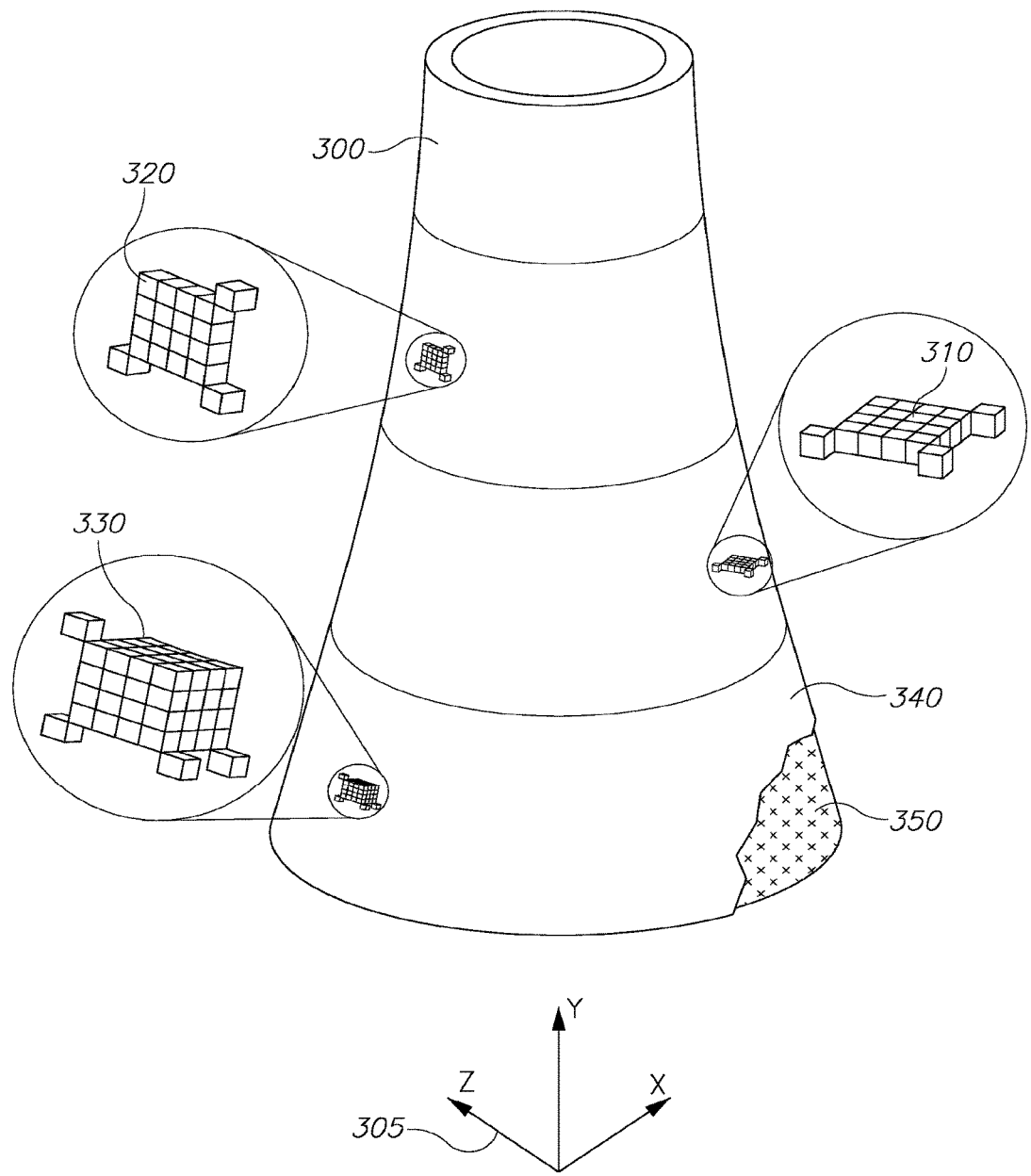
FIG. 3 shows a tangible product in which the disclosed subject matter is used, in accordance with some exemplary embodiments of the subject matter.

Referring now to FIG. 3 showing a three dimensional tangible product, in accordance with some exemplary embodiments of the disclosed subject matter.

A Product 300, such as a 3D tangible product, may comprise a Body Portion 350 and a Skin Portion 340. In some exemplary embodiments, Skin Portion 340 may be an external casing of Body Portion 350. The external casing may be a surface of Product 300 that may come in contact with a different article, a liquid, atmosphere, a combination thereof, or the like. The thickness of the Skin Portion 340 may be at least one voxel. Additionally or alternatively, Body Portion 350 and Skin Portion 340 may be comprised of the same material composition, the same color, the same finish, and other similar characteristics, or the like.

It will be noted that in some exemplary embodiments, Axis System 305 may be an axis system that was used in designing Product 300. Additionally or alternatively, Axis System 305 may be an axis system that was used by additive manufacturing apparatus in production of Product 300. In some exemplary embodiments, the additive manufacturing apparatus may iteratively produce successive layers, each of which in the XZ plane, on top of one another (e.g. in accordance with the Y axis).

In some exemplary embodiments, a plurality of replicas of a signature may be embedded within Body Portion 350. A replica of the signature may be an array comprising any given number of cells. In some exemplary embodiments, the array may be a two dimensional array such as is exemplified in Horizontal Replica 310 and Vertical Replica 320, a three dimensional array such as 3D Replica 330, or the like.

Horizontal Replica 310 is a replica of a signature (not shown) which encodes information. Horizontal Replica 310 comprises a two dimensional array. Horizontal Replica 310 may be embedded in Body Portion 340 in a location parallel to the XZ plane illustrated by Axis System 305.

Vertical Replica 320 may be another replica of the signature (not shown). Vertical Replica 320 may comprise a two dimensional array. Vertical Replica 320 may be embedded in Body Portion 340 in a location parallel to the XY plane illustrated by Axis System 305. Additionally or alternatively, Vertical Replica 320 may be embedded in Body Portion 340 in a location parallel to the YZ plane illustrated by Axis System 305

3D Replica 330 may be another replica of the signature (not shown). 3D Replica 330 may comprise a three dimensional array. 3D Replica 330 may be embedded in the space of Body Portion 340. In some exemplary embodiments, 3D Replica 330 may be positioned in a manner that is aligned with Axis System 305.

In some exemplary embodiments, a single product, such as Product 300, may have embedded therein a plurality of replicas that may or may not be of the same type, such as Vertical Replica 320, Horizontal Replica 310 and 3D Replica 330. In some exemplary embodiments, all replicas embedded within Product 300 may correspond to the same signature and encode the same information.

Figure 4:
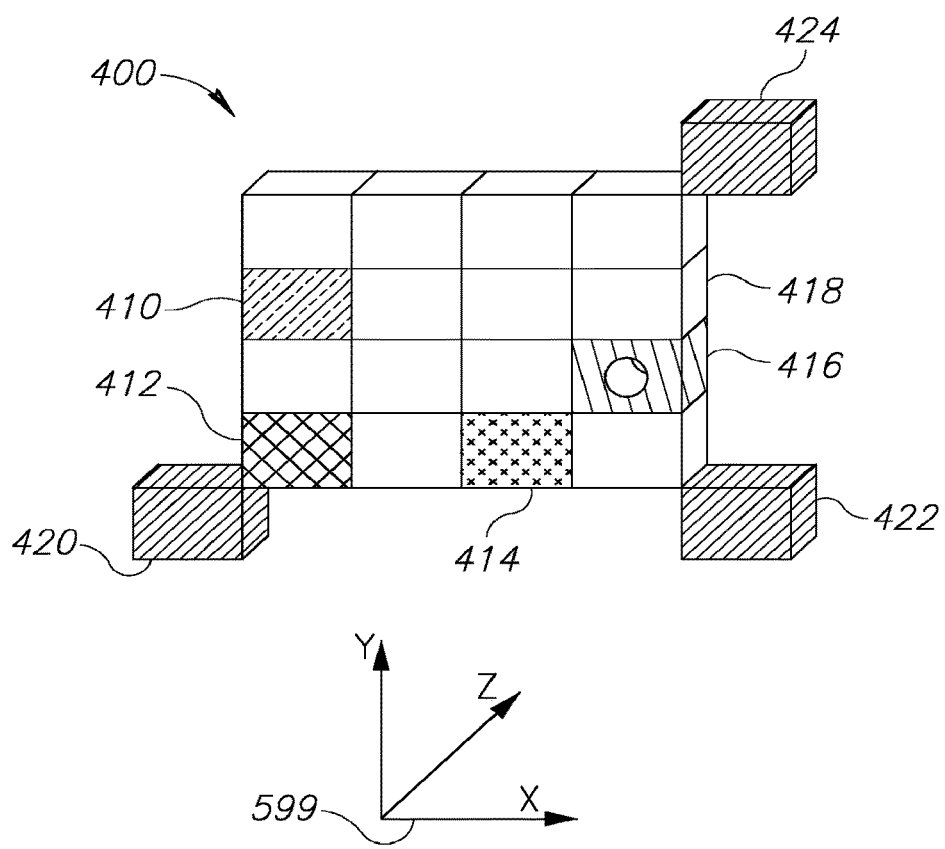
FIG. 4 shows a two dimensional signature, in accordance with some exemplary embodiments of the disclosed subject matter.

Referring now to FIG. 4 showing a two dimensional replica of the signature in accordance with some exemplary embodiments of the disclosed subject matter.

A Two Dimensional (2D) Replica 400 of a signature. The signature may be a 2D matrix. The 2D matrix may be represented by a two dimensional array comprising any given number of cells, wherein each cell may correspond to a different value based on its content. The resulting pattern of the array may represent the content of the 2D matrix. In some exemplary embodiments, the 2D Replica 400 may be a Horizontal Replica, such as 310 of FIG. 3, a Vertical Replica, such as 310 of FIG. 3, or the like.

A cell, such as Cells 410, 412, 414, 416 and 418, may be comprised of volume elements, also referred to as voxels. A "voxel" is the smallest volumetric element produced by a given AMA. The cell may be comprised of any given number of voxels. In some exemplary embodiments, each cell may of about a constant size.

The content of a cell may correspond to a value of an entry in the matrix. The value may be defined based on an amount of substance deposited in the cell, a type of the substance deposited in the cell, a combination thereof, or the like.

In some exemplary embodiments, a different amount of substance deposited in the cell may define a different value, such as a cell comprising more than a predetermined amount of substance or being full with above a predetermined portion may define a first value, whereas a cell not meeting the above-mentioned threshold may define a second value.

In some exemplary embodiments, a type of substance deposited in the cell may define a different value, such as a cell comprising a first substance may correspond to a first value, a cell comprising a second substance may correspond to a second value, and so forth.

As an example, Cell 418, which may be an empty cell, may correspond to a first value. As another example, Cell 412, which may be a cell full with printing substance, may correspond to a second value. As yet another example, Cell 410, which may be a cell partially full with printing substance, may correspond to a third value. It will be noted that an infill density of a cell may define the value. As yet another example, the existence of a specific substance in a cell may define a fourth value, such as may be the case with Cell 414. As yet another example, a shape that is attained in the cell mat define a fifth value, such as may be the case with Cell 416. As will be appreciated, the disclosed subject matter is not limited to any specific definition of values and any combination of the exemplary definitions or other definitions may be utilized.

In some exemplary embodiments, Boundary Markers 420, 422, and 424 may define the boundaries of 2D Replica 400. The boundary markers may mark vertexes on the margin of the array. Each one of the boundary marker may be comprised of any given number of voxels and may or may not have a similar size, a similar shape and similar substance content to one another. It will be noted that the disclosed subject matter is not limited to any specific number of boundary markers.

In some exemplary embodiments, boundary markers, such as 420, 422 and 424, may be used when decoding information from the tangible product to identify the replicas embedded within the product.

In some exemplary embodiments, the matrix may include an error correction code, an error detection code, or the like. When information is decoded from the replica, the error correction or detection code may be used to determine whether the decoded information is correct. In case the decoded information is incorrect, in some embodiments, information may be decoded from another replica embedded within the same product.

In some exemplary embodiments, error correction/detection may be implemented without use of error correction code, error detection code, or the like. Error correction/detection may be implemented by a majority voting procedure in which a plurality of replicas are decoded and the information which is consistent with a higher number of replicas is considered the correct decoded information.

Figure 5:
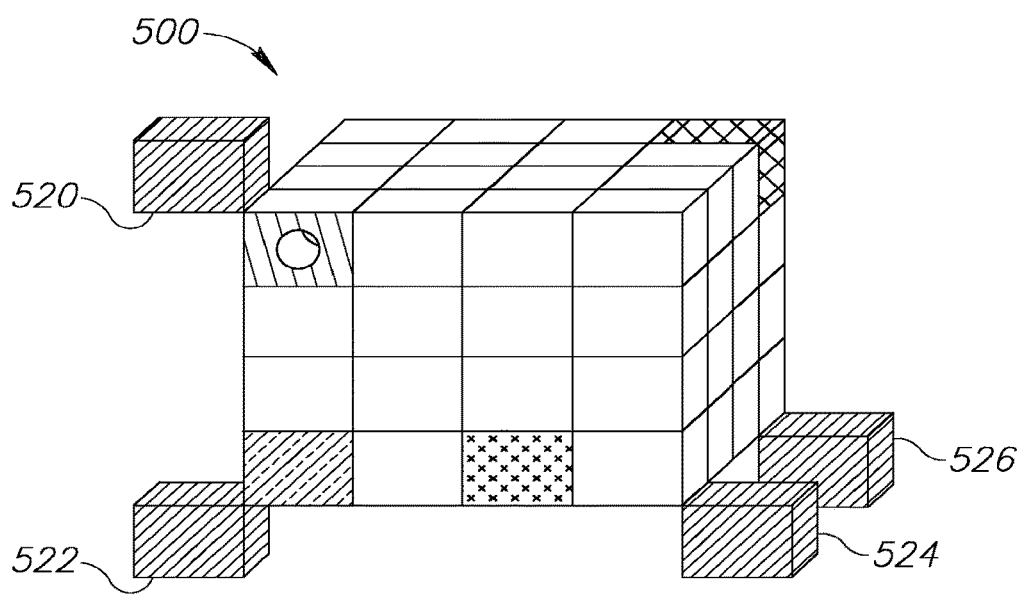
FIG. 5 shows a three dimensional signature, in accordance with some exemplary embodiments of the disclosed subject matter.

Referring now to FIG. 5 showing a three dimensional replica of the signature in accordance with some exemplary embodiments of the disclosed subject matter.

Axis System 599 may be an axis system that was used in designing a product such as Product 300 of FIG. 3. Additionally or alternatively, Axis System 599 may overlap Axis System 305 of FIG. 3.

A 3D Replica 500 of the signature, may correspond to a 3D matrix encoding information. The 3D matrix may be represented by 3D Replica 500 using a 3D array comprising any given number of cells, wherein each cell corresponds to a different value based on its content. The resulting 3D pattern of the 3D array may represent the content of a matrix. In some exemplary embodiments, 3D Replica 500 may be a 3D Replica, such as 330 of FIG. 3, which may be embedded within Body Portion 340 of FIG. 3 in a manner that is aligned with Axis System 305 of FIG. 3.

In some exemplary embodiments, boundary markers may be utilized to identify the boundaries of 3D Replica 500. As an example, Boundary Markers 520, 522, 524 and 526 may define the boundaries of 3D Replica 500.

Figure 6:
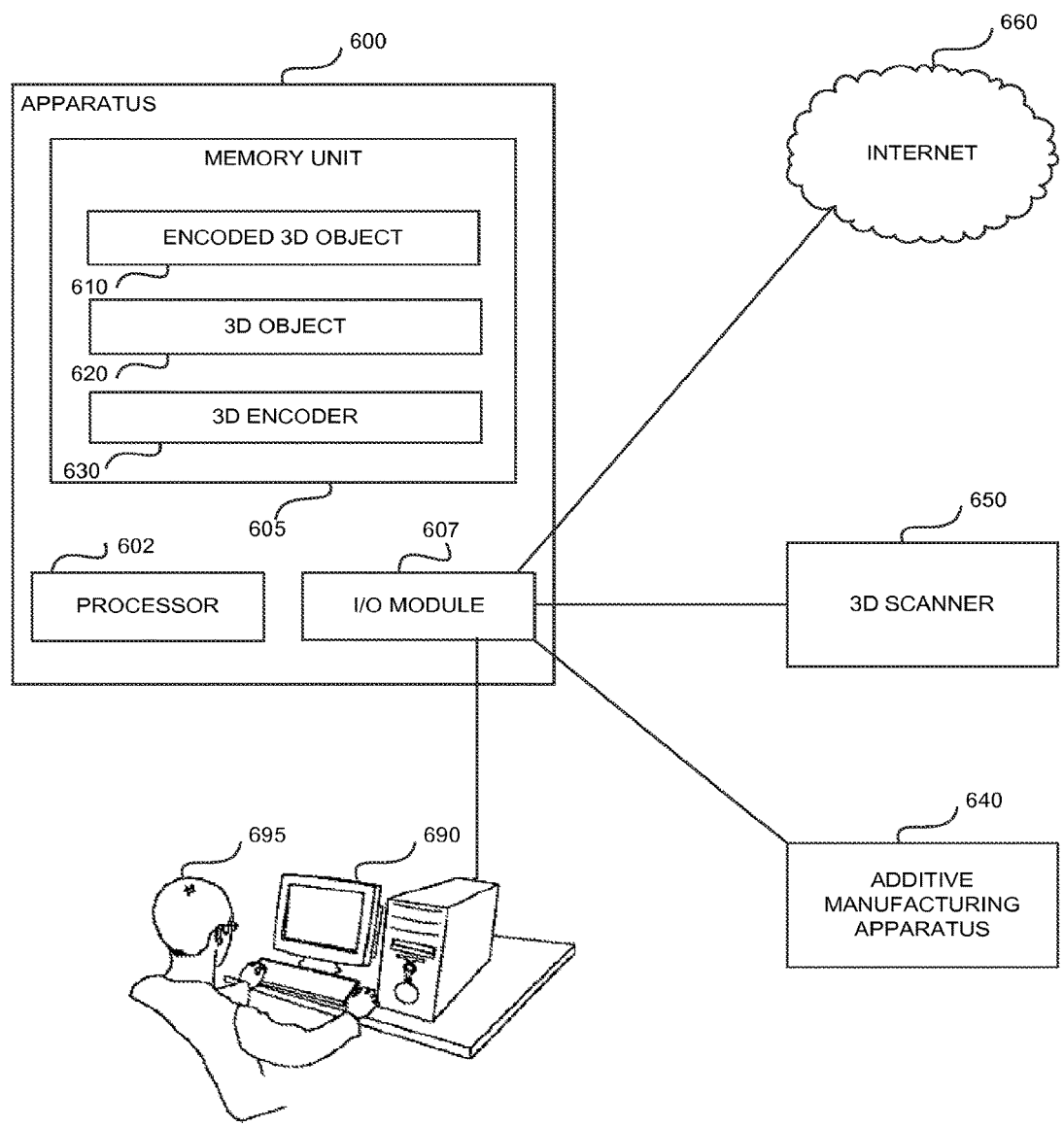
FIG. 6 shows a block diagram of an apparatus, in accordance with some exemplary embodiments of the disclosed subject matter.
Figure 7:
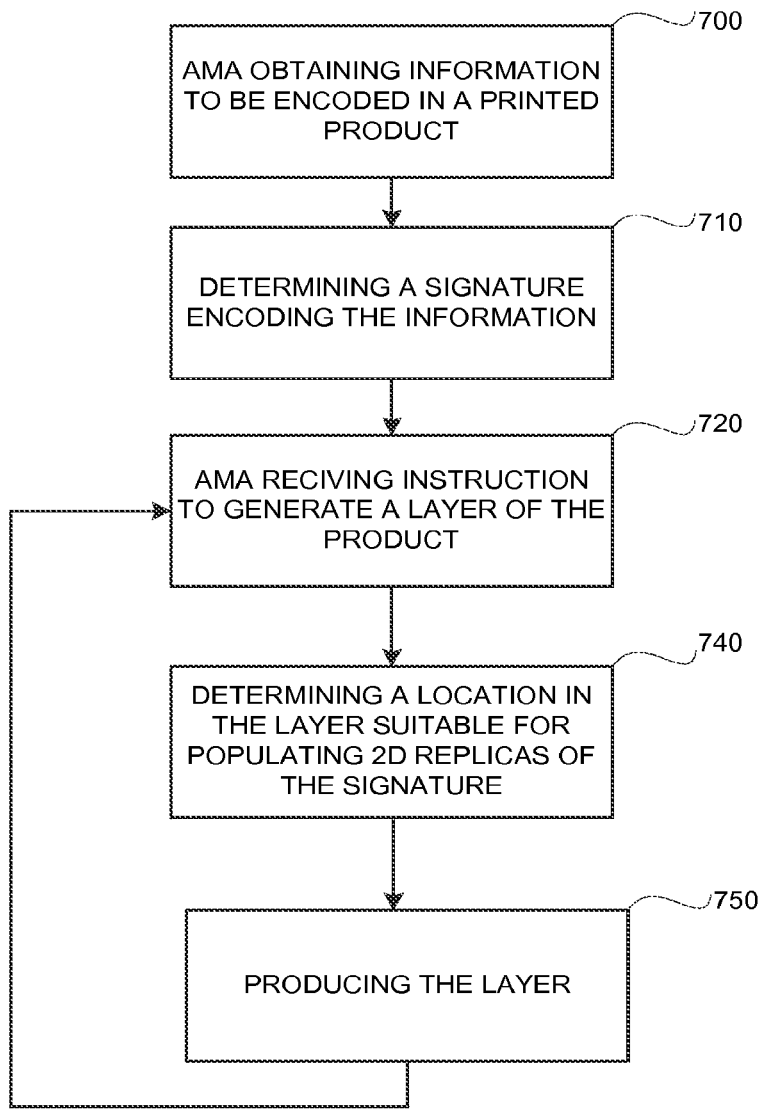
FIG. 7 shows a flowchart diagram of a method, in accordance with some exemplary embodiments of the disclosed subject matter.

Referring now to FIG. 6 showing a block diagram of components of an apparatus, in accordance with some exemplary embodiments of the disclosed subject matter. An Apparatus 600 may be a computerized apparatus adapted to perform methods such as depicted in FIGS. 1, 2, and 7.

In some exemplary embodiments, Apparatus 600 may comprise a Processor 602. Processor 602 may be a Central Processing Unit (CPU), a microprocessor, an electronic circuit, an Integrated Circuit (IC) or the like. Additionally or alternatively, Apparatus 600 can be implemented as firmware written for or ported to a specific processor such as Digital Signal Processor (DSP) or microcontrollers, or can be implemented as hardware or configurable hardware such as field programmable gate array (FPGA) or application specific integrated circuit (ASIC). Processor 602 may be utilized to perform computations required by Apparatus 600 or any of it subcomponents.

In some exemplary embodiments of the disclosed subject matter, Apparatus 600 may comprise an Input/Output (I/O) Module 607. Apparatus 600 may utilize I/O Module 607 as an interface to transmit and/or receive information and instructions between Apparatus 600 and external I/O devices, such as a Workstation 690, a 3D Scanner 650, the Internet 660, an Additive Manufacturing Apparatus 640, or the like.

In some exemplary embodiments, I/O Module 607 may be used to provide an interface to a User 695 of the system, such as by providing output, visualized results, reports, or the like. User 695 may use Workstation 690 to input the information to be encoded. It will be appreciated that Apparatus 600 can operate without human operation.

In some exemplary embodiments, a 3D Scanner 650 may be used. 3D Scanner 650 may be a device that analyzes existing tangible object and collects data on its shape and its appearance. The collected data may be a digital representation of the tangible object. In some exemplary embodiments, 3D Object 620 may be obtained from 3D Scanner 650.

In some exemplary embodiments, an internet connection may be used to connect Apparatus 600 to the Internet 660. The Internet 660 may facilitate the process of communicating a 3D Object 620, an Encoded 3D Object 610, or a similar digital representation, between a proprietor and a manufacturer.

In some exemplary embodiments, AMA 640 may operate as a slave output device of Apparatus 600 to execute printing tasks. Additionally or alternatively, Apparatus 600 may be a 3D printer which may perform the printing tasks on its own. In some exemplary embodiments, Apparatus 600 may comprise a Memory Unit 605. Memory Unit 605 may be persistent or volatile. For example, Memory Unit 605 can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like. In some exemplary embodiments, Memory Unit 605 may retain program code to activate Processor 602 to perform acts associated with any of the steps shown in FIGS. 1, 2, and 7. Memory Unit 605 may also be used to retain a 3D Object 620, an Encoded 3D Object 610, information to encode (not shown), or the like. In some exemplary embodiments, 3D Object 620 is a digital representation of a 3D object that may be used for encoding data. In some exemplary embodiments, an Encoded 3D Object 610 may be a digital representation of a modified 3D object which is based on 3D Object 620 and encodes information in the physical properties of the modified 3D object.

The components detailed below may be implemented as one or more sets of interrelated computer instructions, executed for example by Processor 602 or by another processor. The components may be arranged as one or more executable files, dynamic libraries, static libraries, methods, functions, services, or the like, programmed in any programming language and under any computing environment.

A 3D Encoder 630 may be configured to acquire information for encoding using the 3D Object 620. In some exemplary embodiments, 3D Encoder 630 may be configured to determine a signature that encodes the information, calculate a new set of physical properties based on the information, or the like. In some exemplary embodiments, 3D Encoder 630 may generate Encoded 3D Object 610 by modifying 3D Object 620 and embedding therein a plurality of replicas of the signature, by altering the physical properties data, by performing a combination thereof, or the like.

Referring now to FIG. 7, showing a flowchart diagram of a method in accordance with some exemplary embodiments of the disclosed subject matter.

In Step 700, information may be obtained. The information may be information provided by a proprietor, information related to the manufacturing process, a combination thereof, or the like. In some exemplary embodiments, Step 700 may be performed by an AMA.

In Step 710, the additive manufacturing apparatus, such as AMA 640, may determine a signature to encode the information. The determination may result in a 2D matrix expression of the signature. The 2D matrix may be represented by a Horizontal Replica of the signature, such as 310 of FIG. 3, a Vertical Replica of the signature, such as 310 of FIG. 3, a combination thereof. Additionally or alternatively, the matrix expression may be a 3D matrix expression.

In Step 720, the additive manufacturing apparatus may be instructed to print a layer of the tangible product.

In Step 740, the additive manufacturing apparatus may determine at least one location in the layer suitable for populating a Horizontal Replica of the signature, a Vertical Replica of the signature, a 3D Replica, a combination thereof, or the like.

A suitable location in the layer may be a location that can accommodate the content of a first layer of the replica. In some exemplary embodiments, a single layer may be sufficient to contain the replica, such as in case of a horizontal replica having a height of a single voxel. Additionally or alternatively, in case the replica requires more than a single layer, in successive layers, the AMA may populate the next layer of the replica directly above the previous layer of the replica, which was populated in the previous layer.

It will be noted, that in some embodiments, the AMA may not have a priori knowledge of successive layers of the product. In some cases, the AMA may print an incomplete replica in case one of the successive layers is not able to accommodate a layer of the replica in appropriate location. As an example, the incomplete replica may be printed near a surface of the product and may be cut off due to the defined boundaries of the product.

In Step 750, the additive manufacturing apparatus may produce the layer. The layer may or may not comprise at least one layer of the replica.

Figure 8:
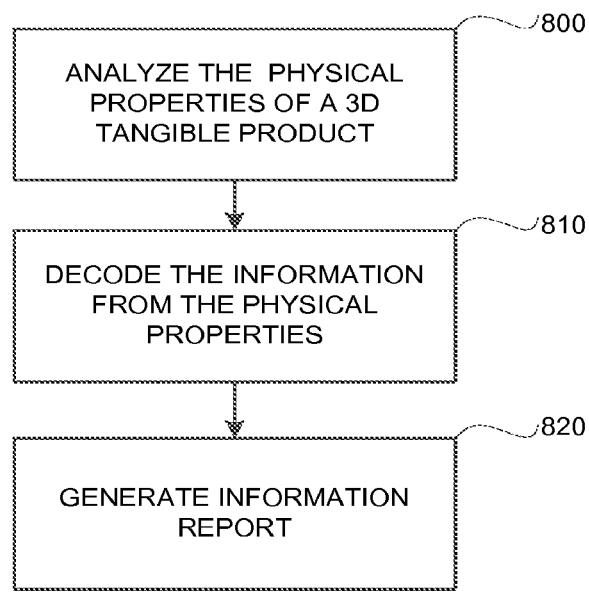
FIG. 8 shows a flowchart diagram of a method, in accordance with some exemplary embodiments of the disclosed subject matter

Referring now to FIG. 8, showing a flowchart diagram of a method in accordance with some exemplary embodiments of the disclosed subject matter.

In Step 800, an analysis of the physical properties of a 3D tangible product may be performed. In some exemplary embodiments, the analysis reveals information which may be encoded in physical properties such as for example an aspect ratio, a product length, a chemical composition, electromagnetic characteristics, an infill density, a combination thereof, or the like. Additionally or alternatively, the analysis may reveal information that is based on the absolute value of the physical property or based on the relative value with respect to an original unmodified version of the 3D tangible product, or the like. In some exemplary embodiments, the analysis may identify one or more replicas of a signature within the product and reveal information encoded in such replicas. In some exemplary embodiments, the analysis of the encoded information may be conducted by utilizing test equipment such as a CT scanner, an MRI scanner, a scale, a spectrometer, a 3D scanner, or the like. Additionally or alternatively, analyzing the physical properties of the product may require destructive mechanical process in which layers of the product may be iteratively removed and analyzed. Additionally or alternatively, the analysis may be a non-destructive process, which may not affect the structural integrity of the product.

In some exemplary embodiments, the information is not encoded on a printed matter such as for example a barcode and a Quick Response (QR) Code. Additionally or alternatively, the information is not encoded on Radio-frequency identification (RFID) chip.

In Step 810, the revealed encoded information may be decoded. In some exemplary embodiments, the decoded information may comprise a MAC Address of the AMA, a product serial number, manufacturing time, a part number, a brand name, a licensing information, identification of a licensee, any data relevant for the product identification, a combination thereof, or the like.

In Step 820, a report of the decoded information may be generated. In some exemplary embodiments, the report may be used in assisting with tracing illegal products such as guns, unauthorized copies of commercial products which were produced by 3D printers, or the like.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, Steps, operations, elements, and/or components, but do not preclude the presence or addition of one or more other features, integers, Steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or Step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   obtaining a representation of a three dimensional object having physical properties;
   obtaining information to encode within the three dimensional object when produced;
   modifying the physical properties to determine modified physical properties, wherein said modifying comprises encoding the information within the physical properties; and
   producing a tangible product, wherein the tangible product is the three dimensional object having the modified physical properties, whereby the tangible product encodes within its physical properties the information, whereby the information is decodable from the tangible product.

2. The method of claim 1, wherein said producing is performed by an apparatus, wherein the information is an identifier of the apparatus.

3. The method of claim 2, wherein, the apparatus is an additive manufacturing apparatus.

4. The method of claim 1, wherein the information is provided by a proprietor of the three dimensional object, wherein the information is useful for identifying an entity which was provided with the representation of the three dimensional object.

5. The method of claim 1, wherein the physical properties comprise a definition of a body portion of the three dimensional object;
   wherein said determining the modified physical properties comprises:
   determining an array of cells representing the information, wherein a content of a volume element in a cell represents a value of the cell, wherein a pattern of the array encodes the information; and
   embedding within the body portion a plurality of replicas of the array of cells.

6. The method of claim 5, wherein the plurality of replicas comprises a horizontal replica, wherein the horizontal replica is embedded in a horizontal layer of the tangible product.

7. The method of claim 5, wherein the plurality of replicas comprises a vertical replica, wherein the vertical replica is embedded in a vertical cross section of the tangible product.

8. The method of claim 7, further comprising:
   determining a location suitable for populating a first row of the vertical replica in a first horizontal layer;
   embedding the first row of the vertical replica in the first horizontal layer; and
   repetitively embedding next rows of the vertical replica in next horizontal layers directly above previous rows of the vertical replica.

9. The method of claim 5, wherein the tangible product comprises a body portion and a skin portion, wherein at least a portion of the plurality of replicas are excluded from the skin portion.

10. The method of claim 1, wherein said encoding the information within the physical properties comprises modifying at least one property which is selected from the group consisting of:
   physical dimensions of the three dimensional object;
   aspect ratio between at least two size measurements of the three dimensional object;
   weight of the three dimensional object; and
   composition of matter of the three dimensional object.

11. The method of claim 1, wherein said encoding the information within the physical properties comprises altering an infill percentage of the tangible product.

12. A tangible product comprising:
   a three dimensional tangible object having modified physical properties; and
   wherein the modified physical properties are a modification of physical properties, wherein the modification encodes information, wherein said tangible product encodes within its physical properties the information, whereby the information is decodable from the tangible product.

13. The tangible product of claim 12, wherein the tangible product is produced by an additive manufacturing apparatus.

14. The tangible product of claim 13, wherein the information is selected from the group consisting of: information provided by a proprietor of the tangible product and an identifier of the additive manufacturing apparatus.

15. The tangible product of claim 12, wherein the modification of physical properties embeds within a body of the tangible product a plurality of replicas of an array of cells, wherein a content of a volume element in a cell represents a value of the cell, wherein a pattern of the array encodes the information.

16. The tangible product of claim 12, wherein the modification of physical properties modifies at least one property selected from the group consisting of:
   physical dimensions of the three dimensional tangible object;
   an aspect ratio between at least two size measurements of the three dimensional tangible object;
   a weight of the three dimensional tangible object;
   a composition of matter of the three dimensional tangible object; and
   infill of at least a portion of the three dimensional tangible object.

17. A method comprising:
   analyzing physical properties of a three dimensional tangible object, wherein the three dimensional tangible object was produced by an additive manufacturing apparatus, wherein information is encoded within the physical properties;
   decoding, by a processor, the information from the physical properties; and
   outputting the information.

18. The method of claim 17, wherein the three dimensional tangible object comprises a plurality of embedded replicates of a signature that encodes the information; wherein said analyzing comprises identifying a replicate of the signature; wherein said decoding comprises decoding the information from the replica.

19. The method of claim 17, wherein the physical properties include at least one of:
   physical dimensions of the three dimensional object;
   an aspect ratio between at least two size measurements of the three dimensional object a weight of the three dimensional object;
   a composition of matter of the three dimensional object; and
   infill of at least a portion of the three dimensional object.

20. A three dimensional (3D) printer comprising:
   a processor configured to perform:
      obtaining a representation of a three dimensional object having physical properties;
      obtaining information to encode within the three dimensional object when produced; and
      modifying the physical properties to determine modified physical properties, wherein said modifying comprises encoding the information within the physical properties; and
   wherein said 3D printer is configured to produce a tangible product, wherein the tangible product is the three dimensional object having the modified physical properties, whereby the tangible product encodes within its physical properties the information, whereby the information is decodable from the tangible product.

21. The 3D printer of claim 20, wherein the information is an identifier of said 3D printer.

22. The 3D printer of claim 20, wherein the information is provided by a proprietor of the three dimensional object, wherein the information is useful for identifying an entity which was provided with the representation of the three dimensional object.

23. The 3D printer of claim 20, wherein said determining the modified physical properties comprises:
   determining an array of cells representing the information, wherein a content of a volume element in a cell represents a value of the cell, wherein a pattern of the array encodes the information; and
   embedding within the tangible product a plurality of replicas of the array of cells.

24. The 3D printer of claim 23, wherein the tangible product comprises a body portion and a skin portion, wherein at least a portion of the plurality of replicas are excluded from the skin portion.

25. The 3D printer of claim 20, wherein said encoding the information within the physical properties comprises altering an infill percentage of the tangible product.

* * * * *